April 6, 1965     C. PETTUS ETAL     3,177,370

MULTIVIBRATOR UTILIZING MAGNETORESISTIVE ELEMENTS

Filed Dec. 19, 1961

INVENTORS
CHARLES PETTUS
THOMAS YOUNG

BY *Leo J. Aubel*

ATTORNEY

3,177,370
MULTIVIBRATOR UTILIZING MAGNETO-RESISTIVE ELEMENTS

Charles Pettus, Vestal, and Thomas Young, Endicott, N.Y., assignors to International Business Machines Corporation, New York, N.Y., a corporation of New York
Filed Dec. 19, 1961, Ser. No. 160,511
5 Claims. (Cl. 307—88)

This invention relates to a multivibrator and more particularly to a multivibrator comprising magnetoresistive elements.

It is known that a number of conductors of electricity, mainly the ferro-magnetic metals such as iron, nickel, cobalt, and the alloys thereof change their electric resistivity when subjected to a magnetic field. The foregoing effect is distinct from the Hall effect in which if a current is flowing in a first axis and if a flux field is at right angles to the first axis, an output voltage is generated across a third axis at right angles to the current excitation and flux axes.

It is a principal object of the present invention to provide a multivibrator comprising magnetoresistive components arranged to provide a switching function.

It is another object of the present invention to provide a multivibrator of relatively high efficiency.

It is another object of the present invention to provide a multivibrator which may be arranged to be extremely fast in operation.

In the attainment of the foregoing objects, there is provided a multivibrator comprising a pair of magnetoresistive elements, each arranged to have a magnetic field induced by the output developed across the other element whereby as one element is energized the other element is deenergized to thereby provide a free running multivibrator.

The foregoing and other objects, features and advantages of the invention will be apparent from the following more particular description of a preferred embodiment of the invention, as illustrated in the accompanying drawings.

Figure 1:
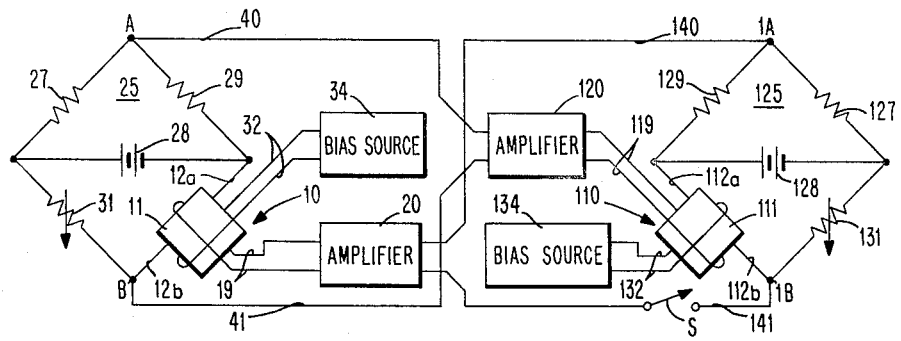
FIG. 1 shows one embodiment of one multivibrator according to the invention.

Referring to FIG. 1, a magnetoresistive storage device 10 is shown which is similar to that shown and described in the copending application of Partovi, Pettus and Young, Serial No. 160,179 filed December 18, 1961, which application is assigned to the same assignee of the present invention.

As indicated in the foregoing application, device 10 comprises a thin film 11 evaporated by any suitable techniques onto a suitable substrate such as glass. Film 11 is connected in series with current carrying lines 12a and 12b. Film 11 has a quiescent resistance to current flowing therethrough.

As indicated in the foregoing copending application, the resistance of the film 11 to current flow therethrough varies dependent on the direction of the lines of force of the applied magnetic field relative to the direction of current flow. More specifically, the voltages across film 11 can be given by the following relations:

$$E1 = i(R + r_k)$$

where $i$ is current flowing through the film,
R is the quiescent resistance of the film, and
$r_k$ is the dynamic resistance when the applied magnetic field is parallel to the current flowing through the film.

When a magnetic field is provided which has lines of force lying in a direction orthogonal to current flow, the voltage across the film may be given by $$E2 = i(R + r'_k)$$

where $r'_k$ is the dynamic resistance when the applied magnetic field is orthogonal to the current flowing through the film 11;
the other factors are as in the preceding equation.

It was found that the resistances $r_k$ and $r'_k$ are of the same magnitude although $r_k \neq r'_k$, and in the embodiment shown, $R \gg r_k$ or $r'_k$; also, $$r_k = \gamma H$$

and $$r'_k = \beta H$$

where $\gamma$ and $\beta$ are magnetoresistive coefficients which differ in polarity; and,
H is the magnetic field indicated in suitable units.

Thus, if a magnetic field is induced in, say, a direction parallel to current flowing through film 11, a resistance of the first magnitude is evident across film 11; further, when the magnetic field in the said parallel direction is collapsed, the resistance across film 11 remains at said first magnitude. Similarly, when a magnetic field is developed in a direction relative orthogonal to current flowing through film 11, a resistance of a second magnitude is evident across film 11; and, when the magnetic field in said orthogonal direction is collapsed, the resistance across film 11 remains at said second magnitude. Also, the voltage developed across film 11 is independent of the sense of the applied field, i.e., whether the fields as indicated in, for example, FIG. 1 of the aforementioned Partovi et al. application, are in the direction indicated by the arrowheads or whether the fields are directly opposite thereto will not effect a change in the voltage across film 11; this fact is evident from the voltage diagrams obtained in FIG. 2.

Since, in the embodiment shown, $R \gg r_k$ or $r'_k$, a conventional bridge type of output circuit 25 is employed with device 10. Bridge 25 comprises resistors 27 and 29 in the first and second legs, a variable resistor 31 on the third leg, and the storage device 10, or more specifically, film 11 in the fourth leg. The junction of the first and second legs is labeled as point A and the junction of the third and fourth legs is labeled as point B. A source of potential in the form of a battery 28 has one terminal connected to the junction of the first and third legs and its other terminal connected to the junction of the second and fourth legs. Resistor 31 is adjusted to balance circuit 25 as against the resistance of the thin film 11.

When the magnetic fields are selectively applied, the resistance of the film changes as indicated above, and the voltage across points A and B of bridge circuit 25 will correspondingly change.

A coil 32 energized by a suitable source of biasing current 34 is wound around thin film 11 to provide a biasing magnetic field. A control coil 19 is wound around film 11; the terminal of the coil 19 is connected to amplifier 20 which selectively provides a control current through the coil as will be explained hereinbelow. Amplifier 20 may be of any suitable known type.

It will readily be appreciated that the circuit of FIG. 1 is symmetrical. The left hand side as oriented in FIG. 1, includes bridge 25 and amplifier 20 and the mirror side of the circuit, the right hand side as oriented in FIG. 1, includes bridge 125 and amplifier 120. The elements on the mirror side of the circuit corresponding to the elements on the left hand side indicated by the same number with a number 1 prefixed thereto (note bridge 25 and bridge 125, device 10 and device 110, etc.)

Note that points A and B of bridge 25 are connected through leads 40 and 41 respectively to amplifier 120 and points 1A and 1B of bridge 125 are connected through leads 140 and 141 respectively to amplifier 20. A switch S is provided in lead 141.

Coil 32 is energized to provide a biasing current and is wound around film 11 in a sense to provide a magnetic field in a direction to cause the film to be in an "ON" state, i.e., to have a resistance of a first magnitude thereacross and to thus cause a voltage V1 of a first magnitude to be obtained across the points A and B of bridge 25. Coil 132 is wound around film 111 to provide a magnetic field in a direction to cause the film to be in an "OFF" state, i.e., a voltage V0 will be obtained across points 1A and 1B of bridge 125.

The operation of the circuit is as follows:

To initiate operation, switch S is closed. The resistance across film 11 is such that a voltage V1 is obtained across points A and B of bridge 25. The voltage V1 is coupled through leads 40 and 41 to amplifier 120 where it is amplified and coupled to coil 119 associated with film 111 of bridge 125. When coil 119 is energized, the resistance of film 111 changes and provides a voltage equal to V1 across terminals 1A and 1B (note, the voltage across terminals 1A and 1B was initially at V0). This voltage V1 developed across terminals 1A and 1B is coupled through leads 140 and 141 back to amplifier 20 where it was amplified and coupled to coil 19 which causes a change in the resistance of the film 11 and turns film 11 "OFF," causing a voltage V0 to be obtained across points A and B of bridge 25.

The voltage V0 coupled to amplifier 20 cuts off the amplifier and the current through coil 119 is interrupted; thus, the bias current in coil 132 turns film 111 "OFF." This, in turn, causes a voltage V0 to appear across points 1A and 1B of bridge 125; this voltage V0 coupled to amplifier 120 cuts off the amplifier and the current through coil 19 is interrupted. Since the coil 19 is not providing a magnetic flux, the bias coil 32 causes film 11 to turn "ON." This, in turn, causes a voltage of the first magnitude V1 to be developed across points A and B of bridge 25; this voltage V1 is coupled through leads 40 and 41 to amplifier 120, and the cycle is repeated. Thus, alternately, one of the units of the circuit provides an output voltage of the first magnitude V1, while the other portion of the circuit provides a voltage of a second magnitude V0.

Figure 2:
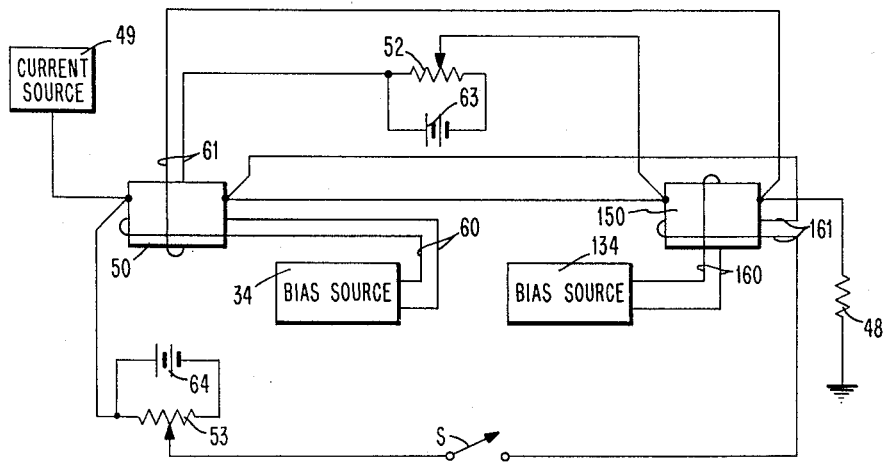
FIG. 2 shows a second embodiment multivibrator in accordance with the invention.

A second embodiment of the invention is shown in FIG. 2, wherein two films 50 and 150 are electrically connected in series with one another, a resistor 48, and a constant current source 49. Films 50 and 150 are similar to one another and to the films of FIG. 1 and function in the same manner. A coil 60 energized by a source of current 34 (labeled as bias source to distinguish from source 49) provides a biasing magnetic field to film 50. Note, that coil 60 provides a field orthogonal to the direction of current flow through film 50. A control coil 61 is wound around film 50 to induce a magnetic field parallel to the direction of current flow in film 50. One terminal of coil 61 is connected through a resistor 52 and a variable tap (not numbered) to one side of film 150 and the other terminal of coil 61 is connected to the other side of film 150. A source of potential indicated as a battery 63 is connected across resistor 52.

A biasing magnetic field which is parallel to the direction of current flow is induced in film 150 by coil 160 energized by bias source 134. A control coil 161 is wound around film 150 to induce a magnetic field orthogonal to the direction of current flow in film 150. One terminal of coil 161 is connected through a switch S, resistor 53 and a variable tap (not numbered) to one side of film 50; the other terminal of coil 161 is connected to the opposite side of film 50. A source of potential indicated as a battery 64 is connected across resistor 53.

Resistor 52 is chosen such that no current flows through it when the biasing magnetic field induced by coil 160 in film 150 is present. Resistor 53 is chosen such that no current flows through it when the field applied to film 50 is in a direction parallel to the current flowing through the film. Note that the resistances of resistors 48, 52 and 53 are much higher than the resistances of films 50 and 150.

The operation of the circuit is as follows:

Initially the voltage across film 50 is V1 and the resistance across the film 50 is of one magnitude; and, the voltage across film 150 is V0 and the resistance across film 150 is of a second magnitude. When switch S is closed, a current is caused to flow from battery 64 through film 50 (from left to right as oriented in FIG. 2), coil 161, switch S, the variable tap and a portion of resistor 53 back to battery 64. Current through coil 161 induces a control magnetic field in film 150 which, in effect, overcomes the biasing magnetic field provided by bias source 134 and coil 160 thus causing a decrease in the resistance of film 150; a voltage V1 appears across film 150. This permits a current to flow from battery 63 through coil 61, film 150 (from right to left as oriented in FIG. 2), the variable tap and a portion of resistor 52 back to battery 63. Coil 61 is wound such that it will induce a magnetic field for film 50 which is parallel to the direction of the current flowing through the film, and which overcomes the biasing field provided by source 34 and coil 60 thus causing an increase in the resistance of film 50; a voltage V0 appears across the film 50. This in turn causes current flow from battery 64 through film 50, coil 161, the variable tap and a portion of resistor 53 to be interrupted. The field induced by coil 161 in film 150 collapses and the resistance across film 150 returns to its initial magnitude; this, in turn causes the current flowing from battery 63, through coil 61, film 150, the variable tap and a portion of resistor 52 to be interrupted and the circuit returns to its initial condition. As soon as the circuit returns to its initial condition the foregoing cycle repeats.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multivibrator circuit comprising first and second magnetoresistive elements, means for providing a current flow in a given direction through each of said elements, a first means for providing a biasing magnetic field to cause said first element to have an electrical resistance of a first magnitude, second means for providing a biasing magnetic field to cause said second element to have an electrical resistance of a second magnitude, first and second control means associated with said first and second elements respectively for providing magnetic fields which selectively counteract the flux of the respective biasing magnetic field, and control means associated with each element for sensing any change in resistance effected across the respective element whereby the control means of one element energizes the other element correspondingly to provide a free running bistable operation.

2. A multivibrator circuit comprising a pair of magnetoresistive elements whose resistance to current flowing therethrough is dependent on the direction of the lines of force of a magnetic field applied thereto, means for providing a current flow in a given direction through each of said elements, first and second means for providing a biasing magnetic field to each of said elements respectively, the biasing field for one element being transverse relative to the direction of current flow through said one element for effecting a resistance of a first magnitude across said one element, the biasing field for the other element being substantially parallel to the direction of current flow through said other element for effecting a resistance of a second magnitude across said other element, first and second current carrying coil means for providing control magnetic fields to each of said elements respectively, said control fields each selectively providing a flux to the associated element to counteract the flux of the biasing field for the associated element, first and second means for sensing changes in the resistance of respective ones of said elements and the change in voltage across said elements corresponding to said change in resistance, and means for connecting the output voltage developed across each of said elements to control the current flowing through the control coil of the other element to thereby cause a shift of control of said other element between the associated biasing and control fields, whereby the effective field applied to each of said elements alternates to thereby provide a bistable operation.

3. A multivibrator circuit comprising first and second ferro-magnetic thin films having magnetoresistive properties in which the electrical resistance of the film changes depends on the orientation of the magnetic lines of force of a magnetic field relative to the direction of current flow through said film, first and second electrical bridge circuits associated with said first and second films respectively, means for energizing each of said bridge circuits, each of said thin films being connected as one leg of the associated bridge, first and second coil means for providing a biasing magnetic field to said first and second films respectively, said first biasing means arranged to cause the resistance of said first film to be of a first magnitude and second biasing means being arranged to cause the resistance of said second film to be of a second magnitude, first and second control coil means for said first and second films respectively, said coil means being energizable and arranged for providing a control magnetic field to the associated film which counteracts the effect of the associated biasing magnetic field, means coupling the coil means associated with each film across the bridge circuit of the other film, and means for energizing said first control coil means to provide a control magnetic field to cause the resistance across said first film to change and to cause the voltage across said first bridge circuit to change correspondingly, and means for coupling the output of said first bridge circuit to said second control coil means associated with said second film whereby said second coil means provides a control magnetic field to cause the resistance across said second film to change and to cause the voltage across said second bridge circuit to change correspondingly, and means for coupling the output of said second bridge circuit to said first control coil means whereby a free running bistable operation is obtained.

4. A multivibrator circuit comprising first and second magnetoresistive elements, means for providing a current flow in a given direction through each of said elements, means for providing a biasing magnetic field to cause said first element to have an electrical resistance of a first magnitude, means for providing a biasing magnetic field to cause said second element to have an electrical resistance of a second magnitude, and control means associated with each of said elements for selectively producing a magnetic field which counteracts the effect of the biasing field for the associated element, the control means for said first element being connected across the second element and being energized in response to a change of resistance of the second element and the control means for said second element being connected across the first element and being energized in response to a change of resistance of the first element, whereby the operating states of the elements are alternately changed.

5. A circuit as defined in claim 4 wherein each of said magnetoresistive elements comprises a thin film.

References Cited by the Examiner

UNITED STATES PATENTS

| | | | |
|---|---|---|---|
| 2,802,953 | 8/57 | Arsenault | 307—88 |
| 2,983,829 | 5/61 | Wanlass | 307—88 |
| 2,994,788 | 8/61 | Clark | 307—88 X |
| 3,004,243 | 10/61 | Rossing | 307—88 X |

IRVING L. SRAGOW, *Primary Examiner.*